(12) United States Patent
de Swardt et al.

(10) Patent No.: US 9,840,200 B2
(45) Date of Patent: Dec. 12, 2017

(54) MIRROR MOUNTING ASSEMBLY

(71) Applicant: Mekra Lang North America, LLC, Ridgeway, SC (US)

(72) Inventors: Rolf Reitz de Swardt, Blythewood, SC (US); Andreas Enz, Columbia, SC (US); Alexandre Petroff, Columbia, SC (US)

(73) Assignee: Mekra Lang North America, LLC, Ridgeway, SC (US)

( * ) Notice: Subject to any disclaimer, the term of this patent is extended or adjusted under 35 U.S.C. 154(b) by 355 days.

(21) Appl. No.: 14/295,978

(22) Filed: Jun. 4, 2014

(65) Prior Publication Data

US 2015/0353016 A1 Dec. 10, 2015

(51) Int. Cl.
| G02B 7/182 | (2006.01) |
| B60R 1/06 | (2006.01) |
| F16B 5/07 | (2006.01) |

(52) U.S. Cl.
CPC ........ *B60R 1/06* (2013.01); *F16B 5/07* (2013.01); *Y10T 29/49877* (2015.01)

(58) Field of Classification Search
CPC .... B60R 1/00; B60R 1/02; B60R 1/06; B60R 1/062; B60R 1/07; B60R 1/072; B60R 1/078
USPC .......................... 359/838, 846, 865, 871–876
See application file for complete search history.

(56) References Cited

U.S. PATENT DOCUMENTS

| 4,981,279 | A | * | 1/1991 | Andreas | B60R 1/066 248/478 |
|---|---|---|---|---|---|
| 5,604,645 | A | * | 2/1997 | Weaver | B60R 1/072 248/27.3 |
| 5,615,054 | A | * | 3/1997 | Lang | B60R 1/0605 359/841 |
| 5,721,646 | A | * | 2/1998 | Catlin | B60R 1/0605 248/476 |
| 6,325,519 | B1 | * | 12/2001 | Lang | B60R 1/0605 248/477 |
| 7,008,089 | B1 | * | 3/2006 | McCloy | B60R 1/1207 362/135 |
| 7,142,345 | B2 | * | 11/2006 | Bonardi | B60Q 1/2665 359/265 |
| 7,222,978 | B2 | * | 5/2007 | Lang | B60R 1/0605 248/475.1 |
| 2005/0082794 | A1 | * | 4/2005 | Geyer | B60R 21/2171 280/728.2 |
| 2006/0061895 | A1 | * | 3/2006 | Lang | B60R 1/0605 359/871 |

* cited by examiner

*Primary Examiner* — Ricky Mack
*Assistant Examiner* — Robert E Tallman
(74) *Attorney, Agent, or Firm* — McNair Law Firm, P.A.; Seann P. Lahey

(57) ABSTRACT

A mirror assembly includes attachments for connecting a mirror retaining plate and a connector assembly, and methods for connecting a mirror retaining plate and a connector assembly, are provided.

14 Claims, 15 Drawing Sheets

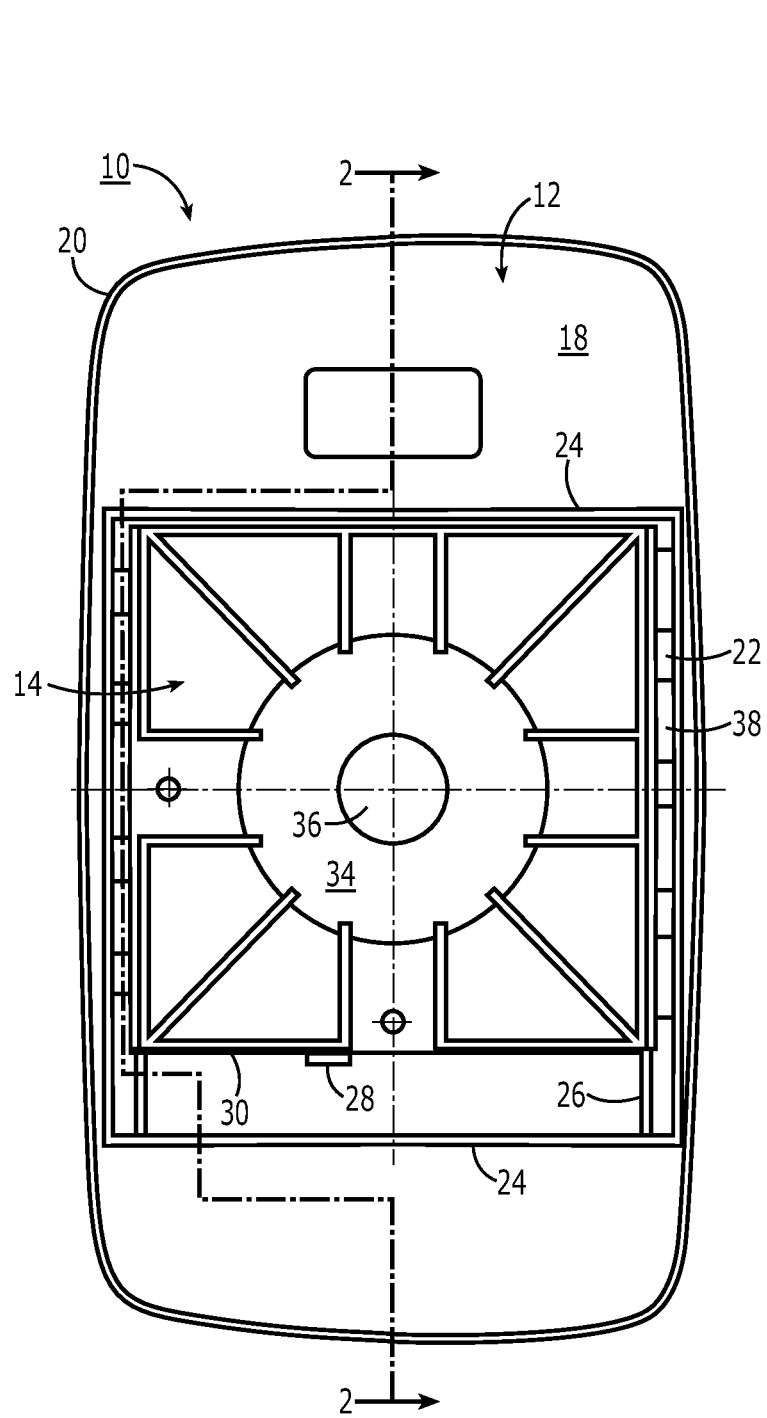
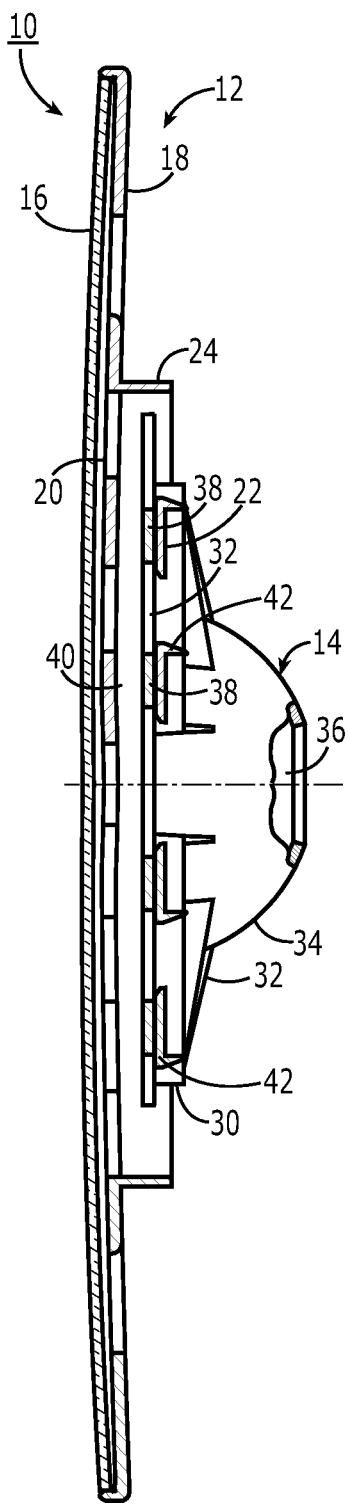
FIG. 1
FIG. 2

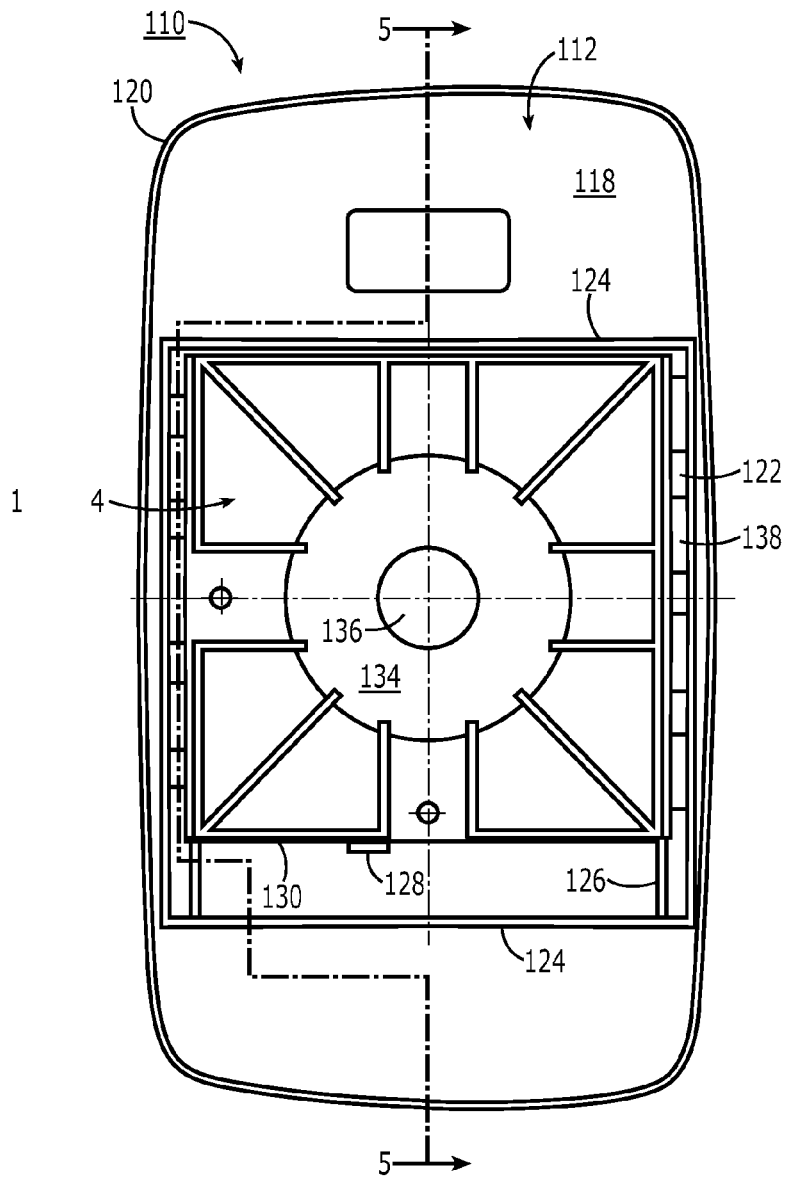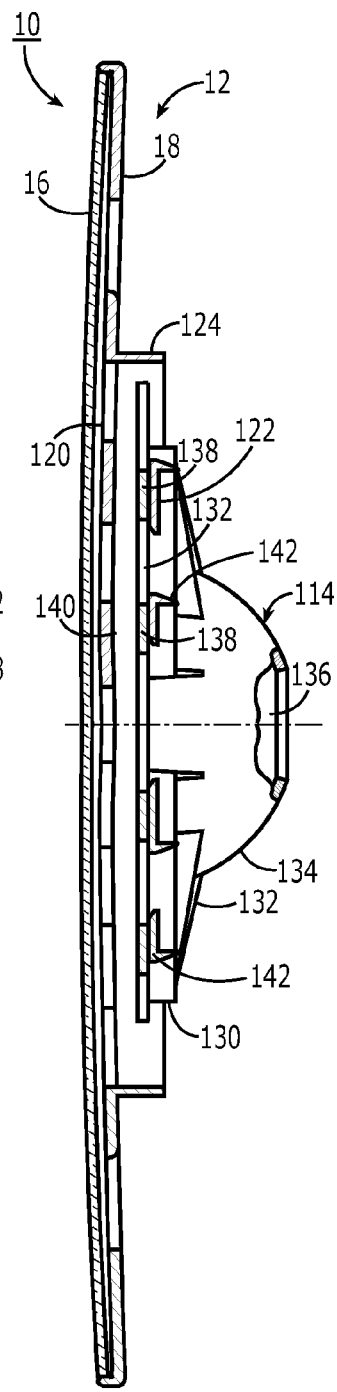
FIG. 4
FIG. 5

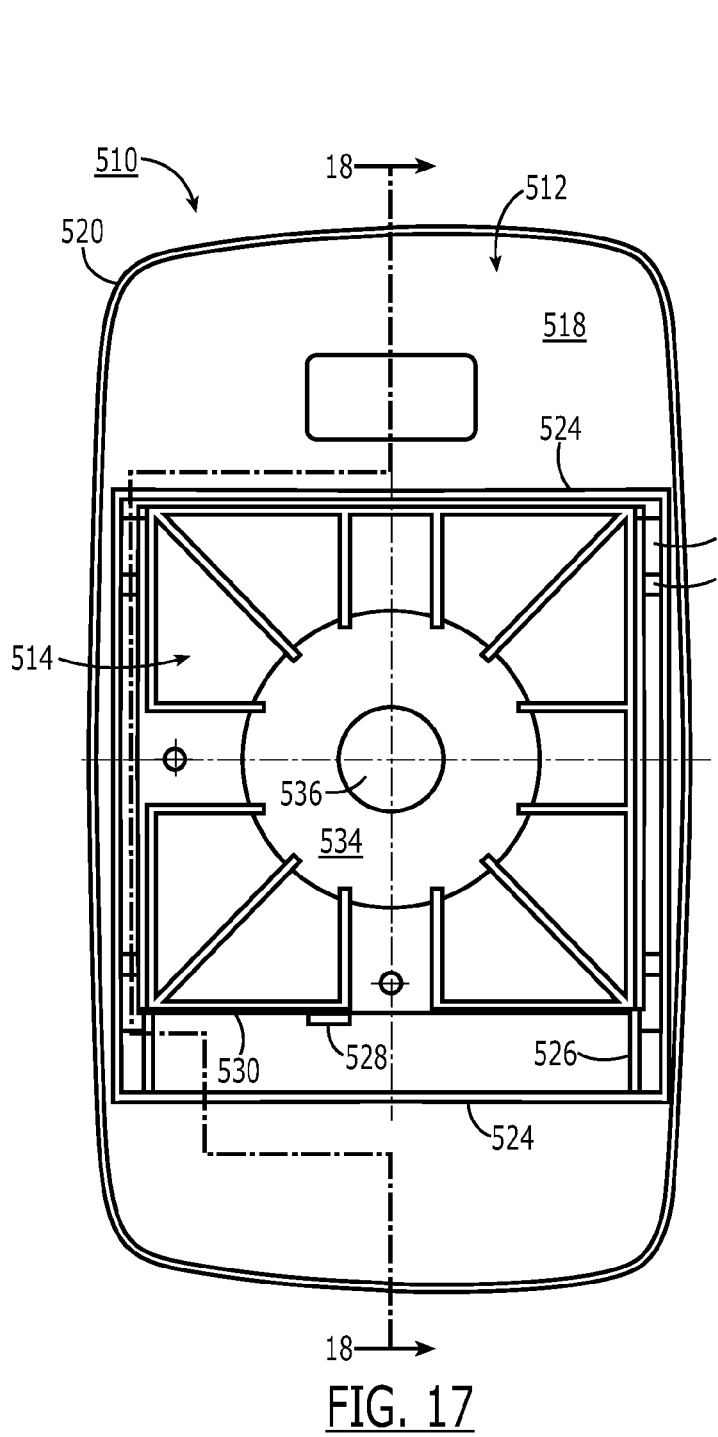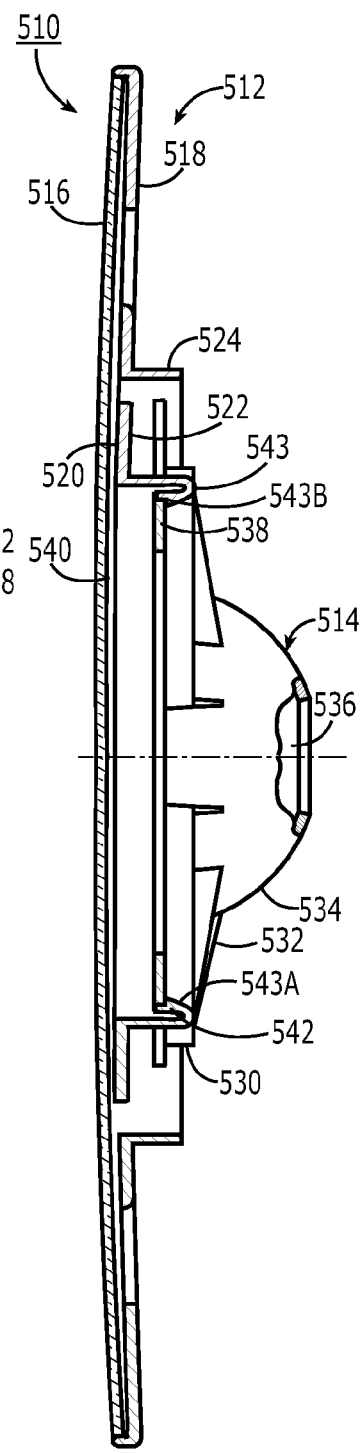
FIG. 17
FIG. 18

MIRROR MOUNTING ASSEMBLY

BACKGROUND

Conventional mirror mounting assemblies lack arrangements adaptable for differing vehicle installations. Moreover, known assemblies do not facilitate mirror glass replacement without having to remove an entire assembly, or they are complex, time-consuming, and expensive to replace or maintain.

What is needed in the industry is a mirror glass mounting system that simplifies installation or replacement procedures while maintaining mirror stability and minimizing or negating vibration. The system should be economical to manufacture and it should be simple, effective, and reliable to use and service.

BRIEF SUMMARY OF THE DISCLOSURE

The present disclosure is directed in general to mirror mounting assemblies. As will be understood from the present disclosure and by its practice, the various embodiments described herein and their equivalents are simple to manufacture, install and use.

For example, in one embodiment according to the present disclosure, a vehicle mirror assembly may include a mirror retaining plate having a plurality of receiving apertures and a plurality of receivers, the receivers being elastically deformable in at least one plane; a connection assembly operatively connected to the mirror retaining plate, the connection assembly having a set of tabs, each of the tabs and the respective apertures alternating in size, the tabs being insertable into respective receiving apertures by deflecting respective receivers to a second state from a first state, each receiver having a spring constant to cause the receiver to return to the first state to connect the connection assembly with the mirror retaining plate, the connection assembly being movable to change the mirror retaining plate; and a mirror glass attachable to the mirror retaining plate.

The receivers of the vehicle mirror assembly may have a proximal end and a distal end and include a detent arranged at the distal end for connection with at least one of the tabs.

A method of securing a mirror retaining plate to a vehicle may include providing a mirror housing having a plurality of pockets formed therein; providing a motor assembly having a plurality of tabs depending therefrom; positioning the mirror housing adjacent the motor assembly; depressing the tabs of the motor assembly into respective apertures of the mirror housing; and rotating the motor assembly to engage at least a portion of at least one of one tab under an edge of one of the pockets of the mirror housing.

Another method may include providing a mirror housing having a plurality of receivers; providing a motor assembly having a plurality of tabs depending therefrom; positioning the mirror housing adjacent the motor assembly; depressing the tabs of the motor assembly against respective receivers of the mirror housing; and deflecting the receivers to engage at least a portion of at least one tab.

Additional aspects of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of such variations upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 is a rear elevational view of an external rear-view mirror assembly according to an aspect of the disclosure;

FIG. 2 is a lateral cross-section view through the assembly according to FIG. 1 along section line 2-2;

FIG. 4 is a rear elevational view of an external rear-view mirror assembly according to another aspect of the disclosure;

FIG. 5 is a lateral cross-section view through the assembly according to FIG. 4 along section line 5-5;

FIG. 17 is a rear elevational view of an external rear-view mirror assembly according to another aspect of the disclosure;

FIG. 18 is a lateral cross-section view through the assembly according to FIG. 16 along section line 18-18;

DETAILED DESCRIPTION OF THE DISCLOSURE

Figure 3:
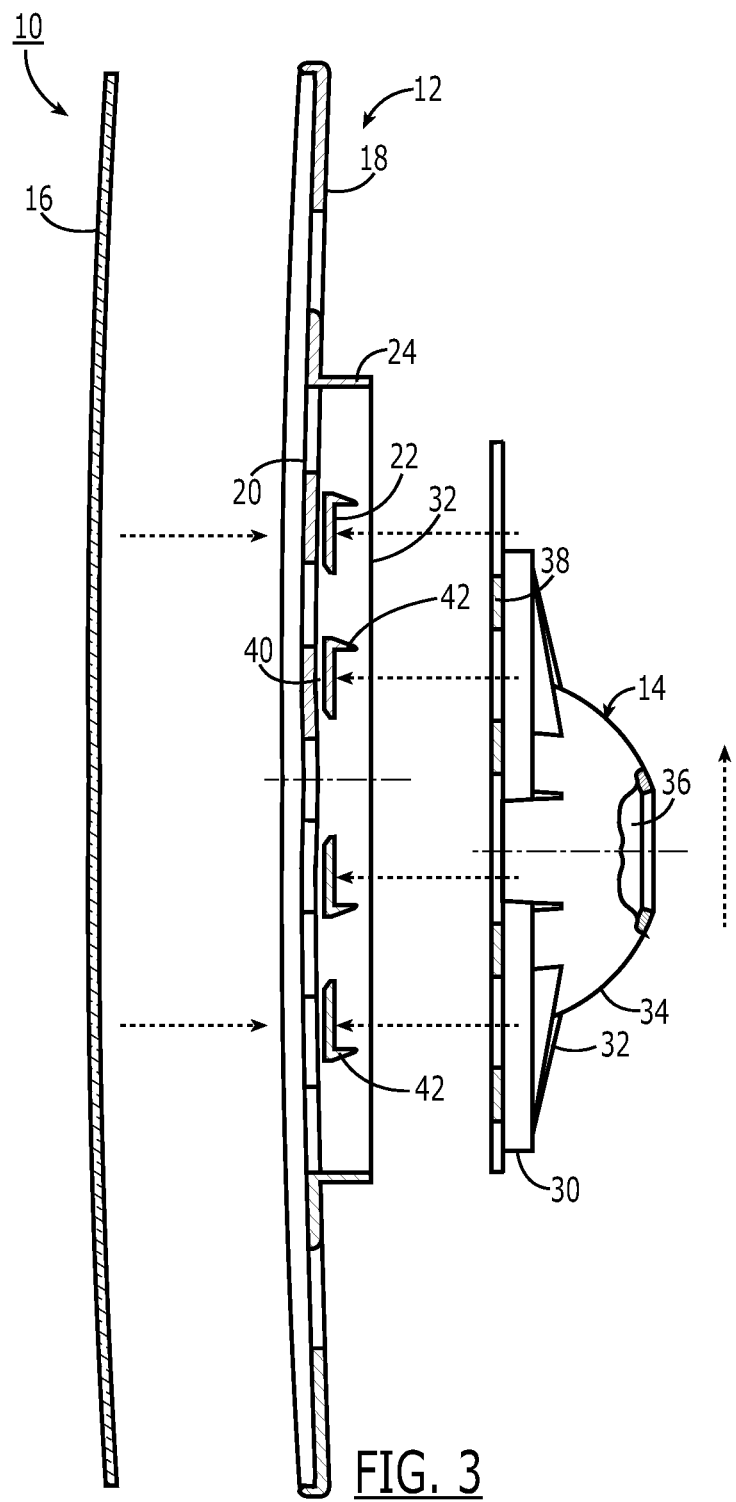
FIG. 3 is lateral exploded and cross-section view through the assembly as in FIG. 1.

Detailed reference will now be made to the drawings in which examples embodying the present subject matter are shown. The detailed description uses numerical and letter designations to refer to features of the drawings.

The drawings and detailed description provide a full and written description of the present subject matter, and of the manner and process of making and using various exemplary embodiments, so as to enable one skilled in the pertinent art to make and use them, as well as the best mode of carrying out the exemplary embodiments. However, the examples set forth in the drawings and in the detailed description are provided by way of explanation only and are not meant as limitations of the disclosure. The present subject matter thus includes any modifications and variations of the following examples as come within the scope of the appended claims and their equivalents.

Turning now to FIGS. 1 and 2, a mirror mounting assembly is designated in general by the number 10. The assembly 10 broadly includes a body, housing, or mirror supporting plate 12, a socket, retaining or connection assembly 14, and a mirror glass or plate 16. As shown in this example, the housing 12 may include a first or back side 18 and a second or front side 20. The connection assembly 14 may be releasably attached or connected to the back side 18, and the mirror glass 16—slightly convex in this example—may be attached to the front side 20 by press-fitting, adhesives, and combinations thereof.

FIG. 1 most clearly shows that the back or rear side 18 may include one or more receivers or projections 22 disposed about a retainer, perimeter, or holding wall 24. One or more ribs or spines 26 may be employed for additional strength, structural integrity, and/or vibration reduction. A spring element or locking tab 28 may be included to receive a portion of the connection assembly 14, as more fully explained below, and for quick release of the connection assembly 14.

Turning more particularly to the exemplary connection assembly 14 shown in FIGS. 1 and 2, the connection assembly 14 may include an internal or servient perimeter or wall 30 that nests inside of the holding wall 24. The assembly 14 may incorporate one or more assembly ribs or splines 32 for additional structural integrity. As shown, the assembly 14 may also include a case or secondary housing 34 in which a motor or electronics (not shown) are housed. In this example, the case 34 may be rounded like a ball joint and include one or more wire or control apertures 36 for routing mechanical cables or electronics in order to adjust the assembly 10 and therefore a reflected image in the mirror glass 16. The connection assembly 14 may include one or more extensions or tabs 38. As shown, the tabs 38 mate with respective receivers 22 at the rear side 18.

FIG. 2 shows a first or assembled state in which the tabs 38 of the connection assembly 14 may be inserted past the receivers 22 into respective pockets or passages 40 of the retaining plate 12. As shown, the receivers 22 may include snaps or fingers 42. In this example, one or more of the snaps 42 may be located at or near an upper portion of their respective receivers 22 and one or more other snaps 42 may be located at or near a lower part of their respective receivers 22. Once the tabs 38 are pressed into the pockets 40 in a direction of the mirror 16, the assembly 14 may slide in an upward or downward direction past the receivers 22 to lock the assembly 14 and the retaining plate 12 together.

With reference now to FIG. 3, the mirror assembly 10 is shown in an unassembled, preassembly, or second state in which the retaining plate 12 is located between the connection assembly 14 and the mirror 16. Here, the relationship and possible structure of the tabs 38 of the assembly 14 are shown relative to the receivers 22, their respective snaps 42 and to the pockets 40 of the retaining plate 12. The horizontally disposed arrows indicate bringing the components together, and a vertically oriented arrow indicates that the connection assembly 14 may be slid in an upward direction relative to the plate 12 to assemble or lock together the plate 12 and the assembly 14. Alternatively, the plate 12 may slide relative to the assembly 14.

Turning to FIGS. 4 and 5, a mirror mounting assembly is designated in general by the number 110. The assembly 110 broadly includes a body, housing, or mirror supporting plate 112, a socket, retaining or connection assembly 114, and a mirror glass or plate 116. As shown in this example, the housing 112 may include a first or back side 118 and a second or front side 120. The connection assembly 114 may be releasably attached or connected to the back side 118, and the convex-shaped mirror glass 116 in this example may be attached to the front side 120 by press-fitting, adhesives, and combinations thereof.

FIG. 4 most clearly shows the connection assembly 114 with an internal or inner perimeter or wall 130 which is located within the holding wall 124 of the housing 112. The assembly 114 may incorporate one or more assembly ribs or splines 132 for additional structural integrity and/or for vibration reduction. Also, the assembly 114 may also include a case or secondary housing 134 in which a motor or electronics (not shown) are housed. In this example, the case 134 may be shaped like a ball joint or a partial sphere and may include one or more wire harness apertures 136 for routing cables or wires to control the assembly 110 and to therefore change a reflection in the mirror 116.

FIG. 5 particularly shows a first or assembled state in which the tabs 138 may be inserted into respective pockets or passages 140 located in the mirror housing 112. As shown, receivers 122 may include snaps or fingers 142. In this example, one or more of the snaps 142 may be located at or near an upper portion of their respective receivers 122 and one or more other snaps 142 may be located at or near a lower part of their respective receivers 122. The receivers 122 may be sized and oriented differently. Here, for example, the topmost receiver 122 is larger than the next receiver, which in turn is smaller than the next. The bottommost receiver 122 is also smaller than the larger receivers 122. Once the tabs 138 are pressed into the pockets 40 in a direction of the mirror 116, the assembly 114 may slide in an upward or downward direction past the receivers 122 to lock the assembly 114 and the retaining plate 112 together.

Figure 6:
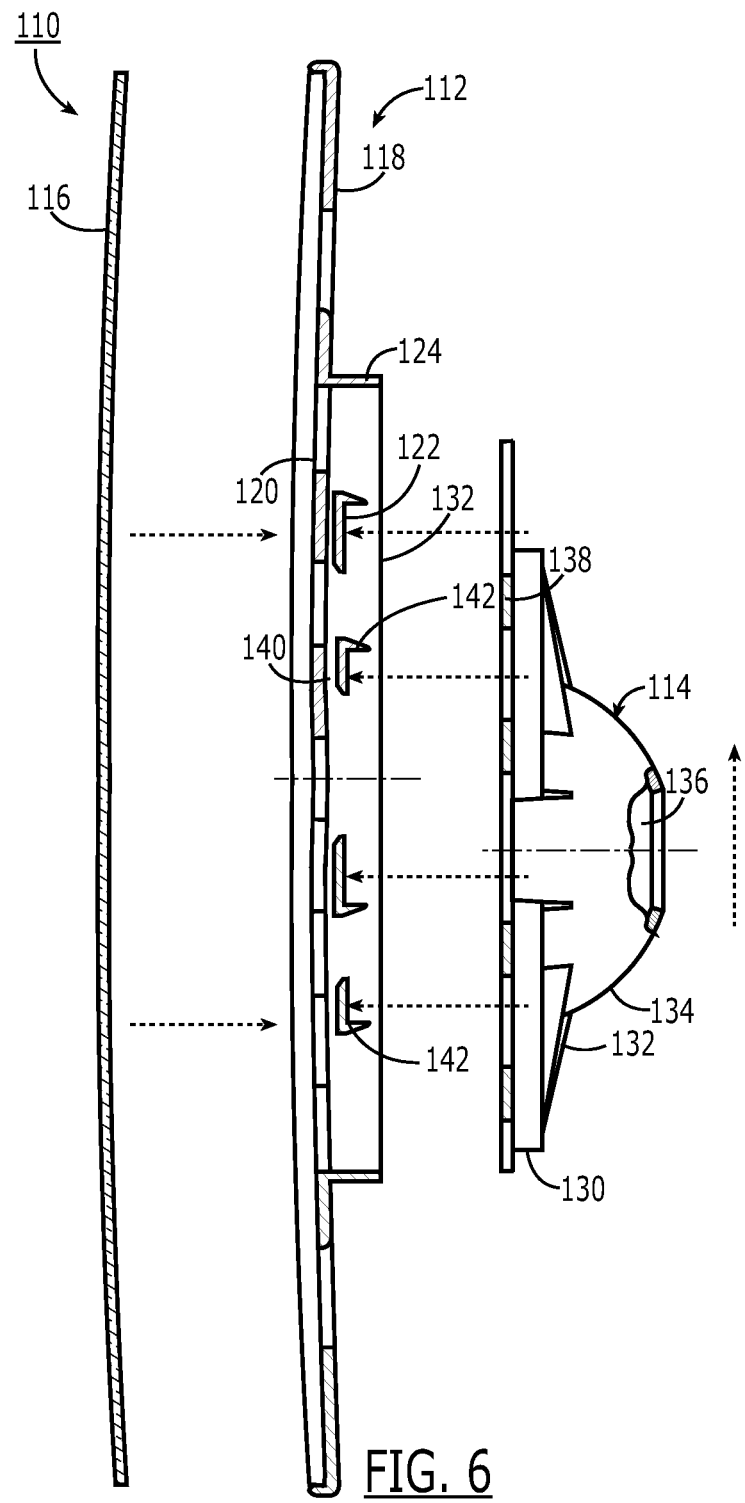
FIG. 6 is lateral exploded and cross-section view through the assembly as in FIG. 4.

FIG. 6 shows the mirror assembly 110 in an unassembled or second state in which the retaining plate 112 is located between the connection assembly 114 and the mirror 116. Here, the relationship and possible structure of the tabs 138 of the assembly 114 are shown relative to the receivers 122, their respective snaps 142 and to the pockets 140 of the retaining plate 112. The horizontal arrows indicate a first step in assembling the components and the vertical arrow indicates a locking or connection step.

Figure 7:
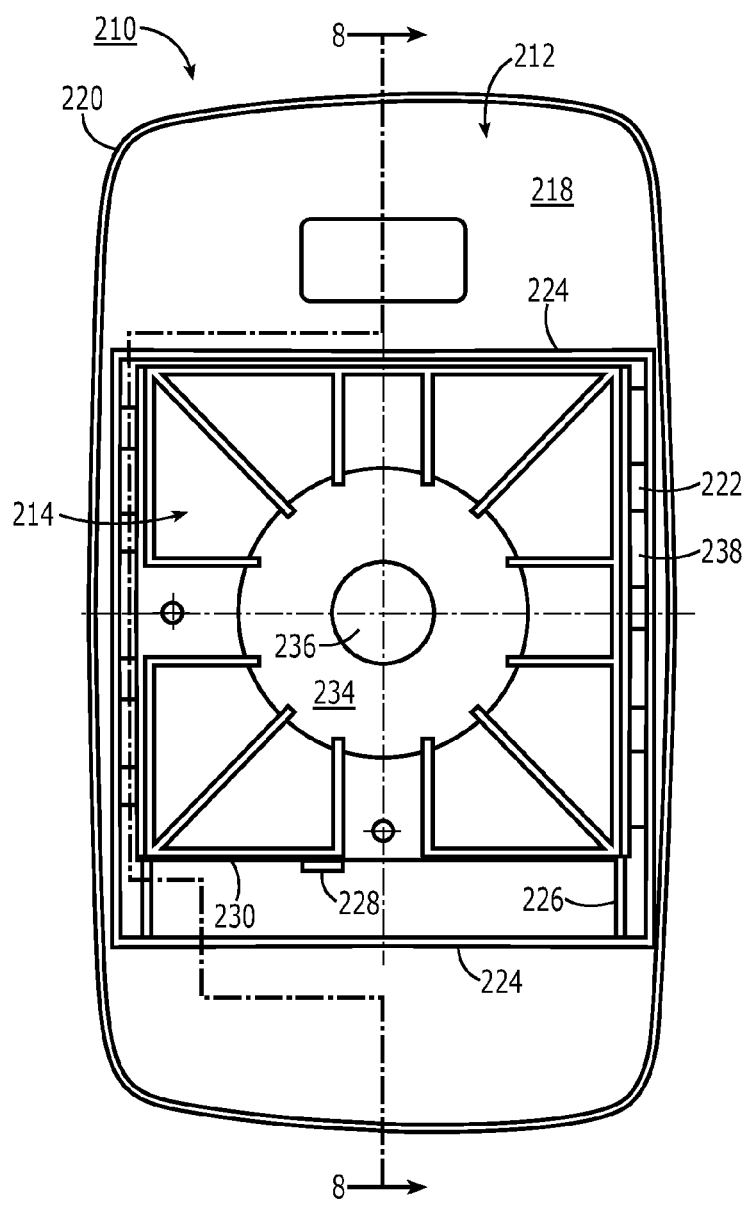
FIG. 7 is a rear elevational view of an external rear-view mirror assembly according to another aspect of the disclosure.
Figure 8:
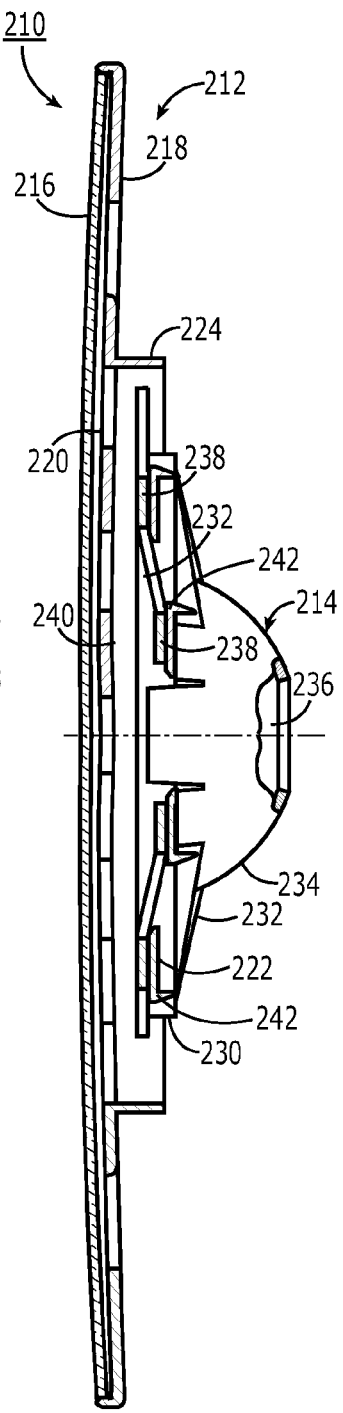
FIG. 8 is a lateral cross-section view through the assembly according to FIG. 7 along section line 8-8.

FIGS. 7 and 8 show a mirror mounting assembly designated in general by the number 210. The assembly 210 broadly includes a body, housing, or mirror supporting plate 212, a socket, retaining or connection assembly 214, and a mirror glass or plate 216. As shown in this example, the housing 212 may include a first or back side 218 and a second or front side 220. The connection assembly 214 may be releasably attached or connected to the back side 218, and the convex-shaped mirror glass 216 may be attached to the front side 220 by press-fitting, adhesives, and combinations thereof.

FIG. 7 most clearly shows the connection assembly 214 with an internal or inner perimeter or wall 230 with the holding wall 224 of the housing 112 located around the wall 230. The assembly 214 may incorporate one or more assembly ribs or splines 232 for additional structural integrity and/or for vibration reduction. Also, the assembly 214 may also include a case or secondary housing 234 in which a motor or electronics (not shown) are housed. In this example, the case 234 may be shaped like a ball joint or a partial sphere and may include one or more wire harness apertures 236 for routing cables or wires to control the assembly 210 and to therefore change a reflection in the mirror 216.

FIG. 8 particularly shows a first or assembled state in which the tabs 238 may be inserted into respective pockets or passages 240 located in the mirror housing 212. As shown, receivers 222 may include snaps or fingers 242. In this example, one or more of the snaps 242 may be located at or near an upper portion of their respective receivers 222 and one or more other snaps 242 may be located at or near a lower part of their respective receivers 222. The receivers 122 may be sized and oriented differently. Here, two of the receivers 222 are nearer the aperture 236 and the topmost and bottom receivers 222 are positioned closer to the mirror 216. Each of the receivers 222 may have respective snaps 242. As shown, once the tabs 238 are pressed into the pockets 240 in a direction of the mirror 216, the assembly 214 may slide in an upward or downward direction past the receivers 222 to lock the assembly 214 and the retaining plate 212 together.

Figure 9:
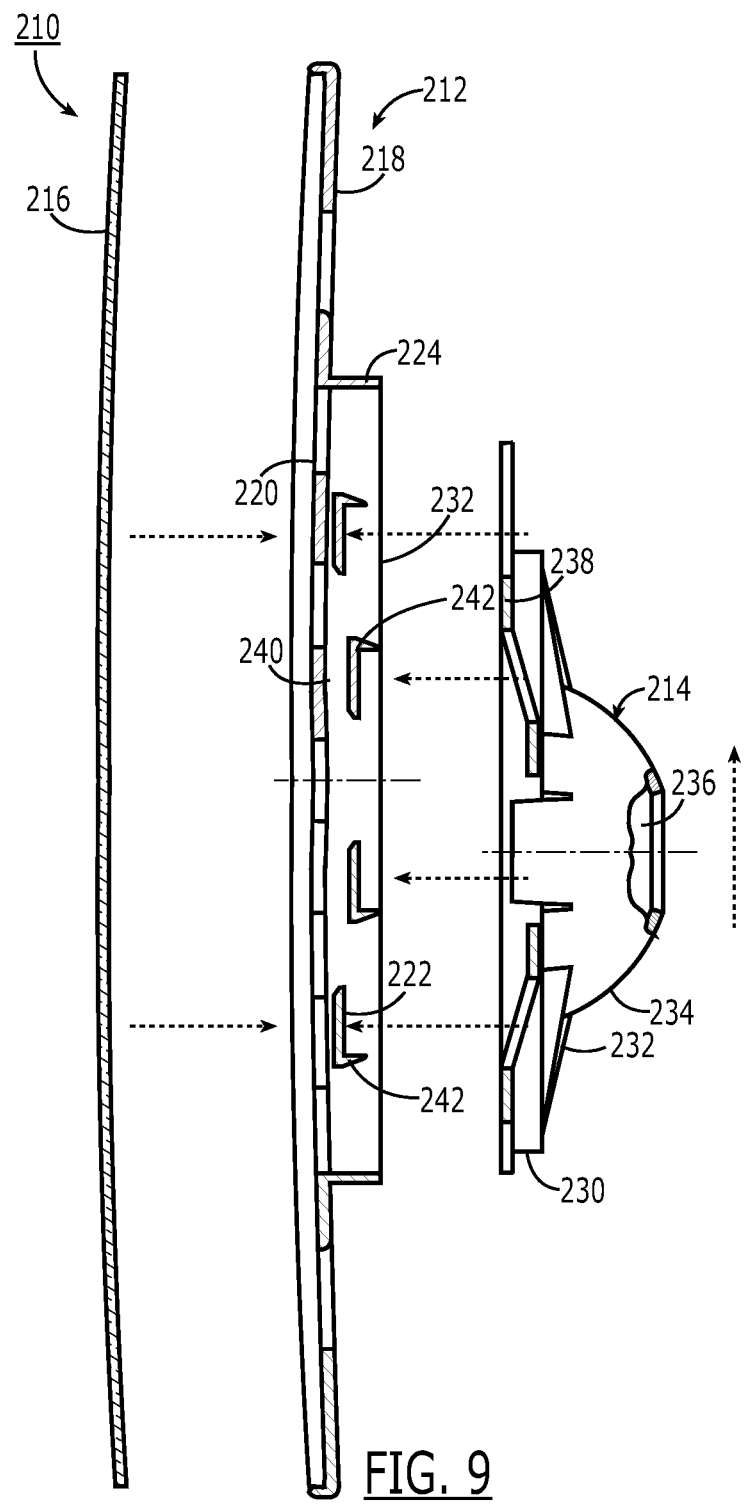
FIG. 9 is lateral exploded and cross-section view through the assembly as in FIG. 7.

FIG. 9 shows the mirror assembly 210 in a pre-assembly or second state in which the retaining plate 212 is located between the connection assembly 214 and the mirror 216. Here, the relationship and possible structure of the tabs 238 of the assembly 214 are shown relative to the receivers 222, their respective snaps 242 and to the pockets 240 of the retaining plate 212. Also shown, at least one of the receivers 222 may include snaps 242 at either end.

Figure 10:
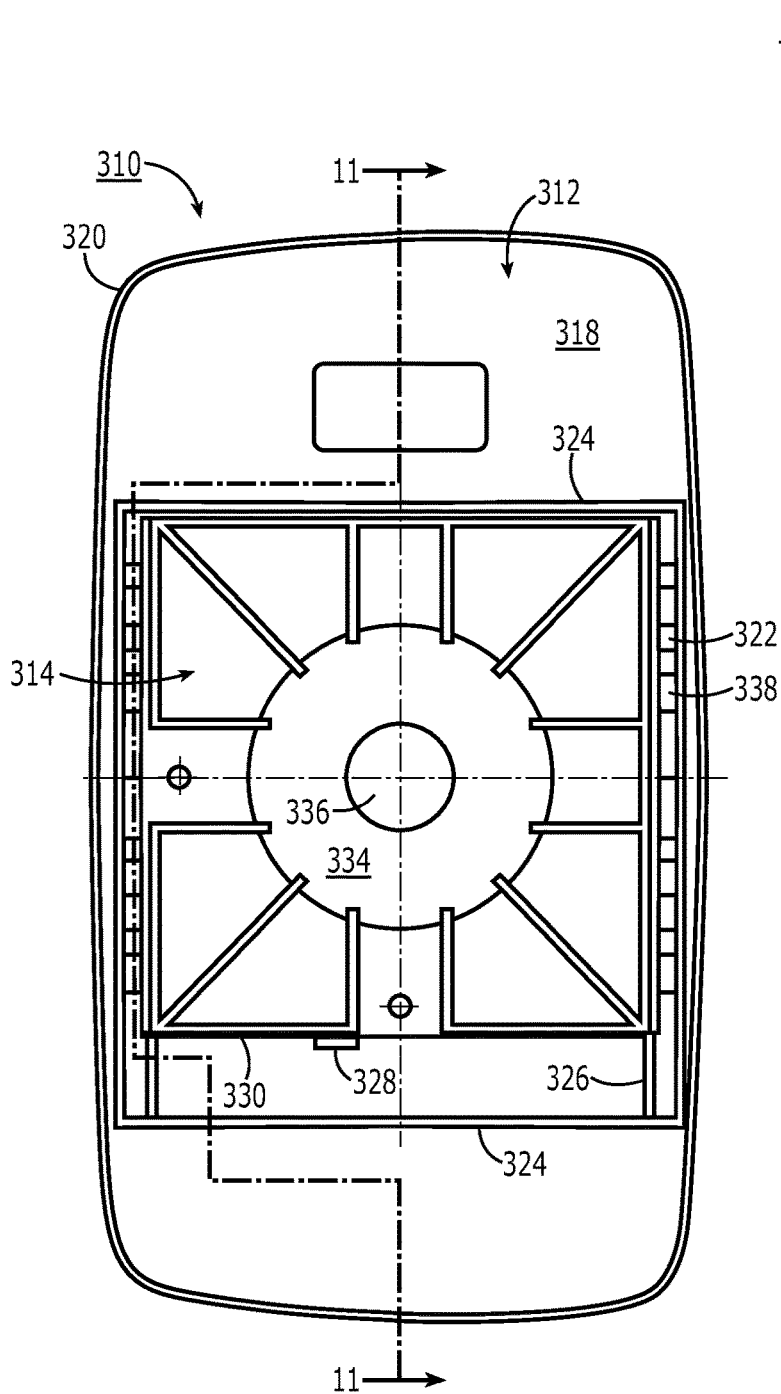
FIG. 10 is a rear elevational view of an external rear-view mirror assembly according to another aspect of the disclosure.
Figure 11:
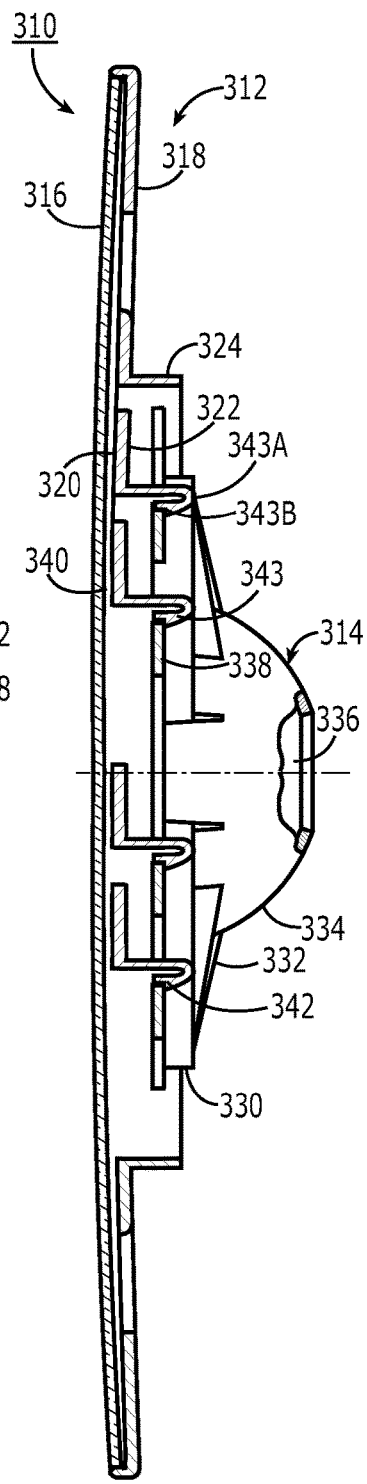
FIG. 11 is a lateral cross-section view through the assembly according to FIG. 10 along section line 11-11.

Turning now to FIGS. 10 and 11, a mirror mounting assembly is designated on the whole by the number 310. The assembly 310 generally includes a body, housing, or mirror supporting plate 312, a socket, retaining or connection assembly 314, and a mirror glass or plate 316. As shown in this example, the housing 312 may include a first or back side 318 and a second or front side 320. The connection assembly 314 may be releasably attached or connected to the back side 318, and the convex-shaped mirror glass 316 may be attached to the front side 320 by press-fitting, adhesives, and combinations thereof.

FIG. 10 most clearly shows the connection assembly 314 with an internal or inner perimeter or wall 330 with the holding wall 324 of the housing 312 located around the wall 330. The assembly 314 may incorporate one or more assembly ribs or splines 332 for additional structural integrity and/or for vibration reduction. Also, the assembly 314 may also include a case or secondary housing 334 in which a motor or electronics (not shown) are housed. In this example, the case 334 may be shaped like a ball joint or a partial sphere and may include one or more wire harness apertures 336 for routing cables or wires to control the assembly 310 and to therefore change a reflection in the mirror 316.

FIG. 11 particularly shows a first or assembled state in which the tabs 338 may be inserted past respective snap connectors 342 at distal ends of the receivers 322, which are connected to the housing 312 at distal ends of the receivers 322. As shown, the snaps or fingers 342 may have angled or inclined portions 343 depending from respective rounded ends 343A of the receivers 322. In this example, the rounded receivers 322 and their respective snaps 342 are made of polyethylene or other plastic material and have an inherent spring constant. Here, the snaps 342 include a ledge or lip 343B at the end of the inclined portions for catching and holding the tabs 338. As shown, once the tabs 338 are pressed against the inclined portions and slid in a direction of the mirror 316, the spring constant of the snaps 342 allow them to deflect, in this example, in an upward direction, and snap back such that a part of the tabs 338 are retained by the lip of the snaps 342 to lock the assembly 314 and the retaining plate 312 together.

Figure 12:
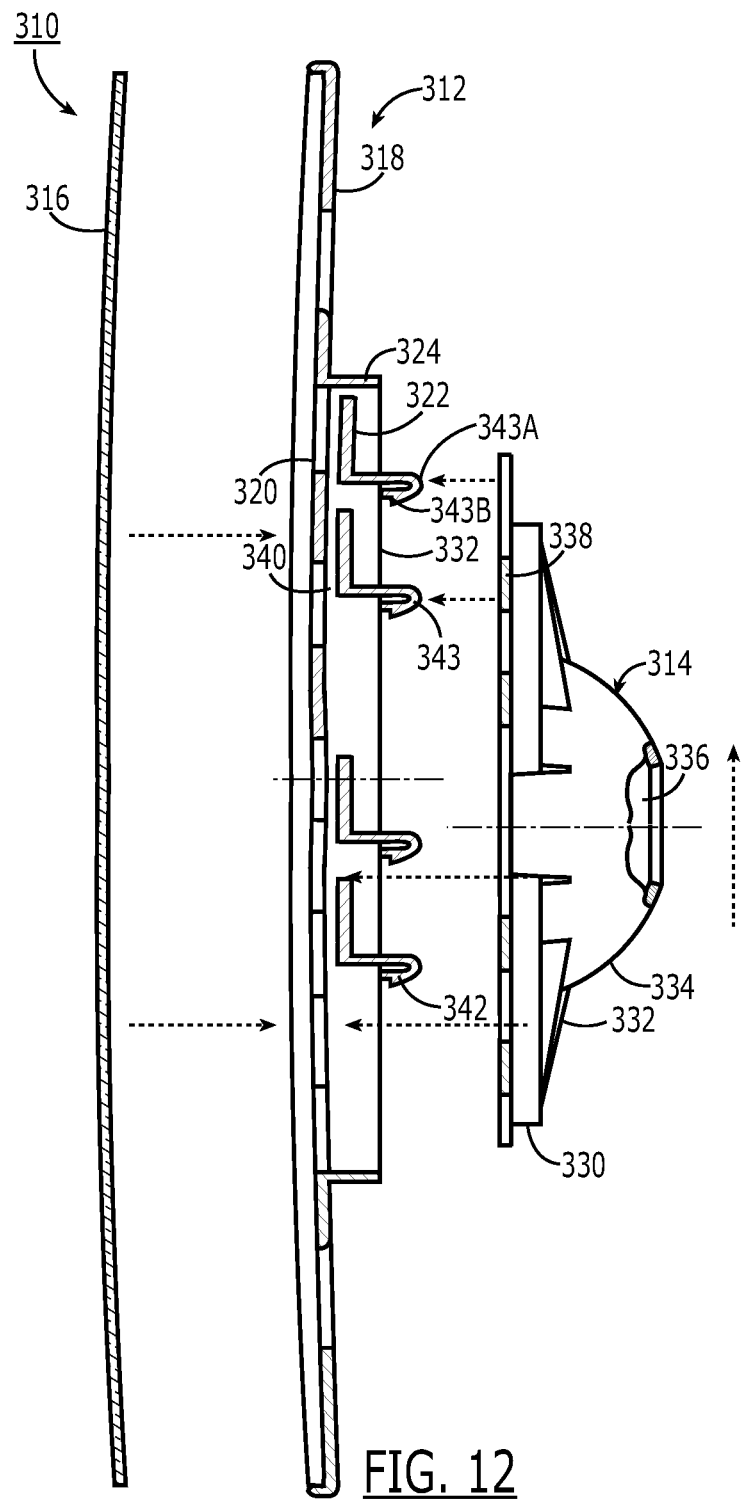
FIG. 12 is lateral exploded and cross-section view through the assembly as in FIG. 10.

FIG. 12 shows the mirror assembly 310 in a pre-assembly or second state in which the retaining plate 312 is located between the connection assembly 314 and the mirror 316. Here, the relationship and possible structure of the tabs 338 and the receivers 322 and their respective snaps 342 are shown.

Figure 13:
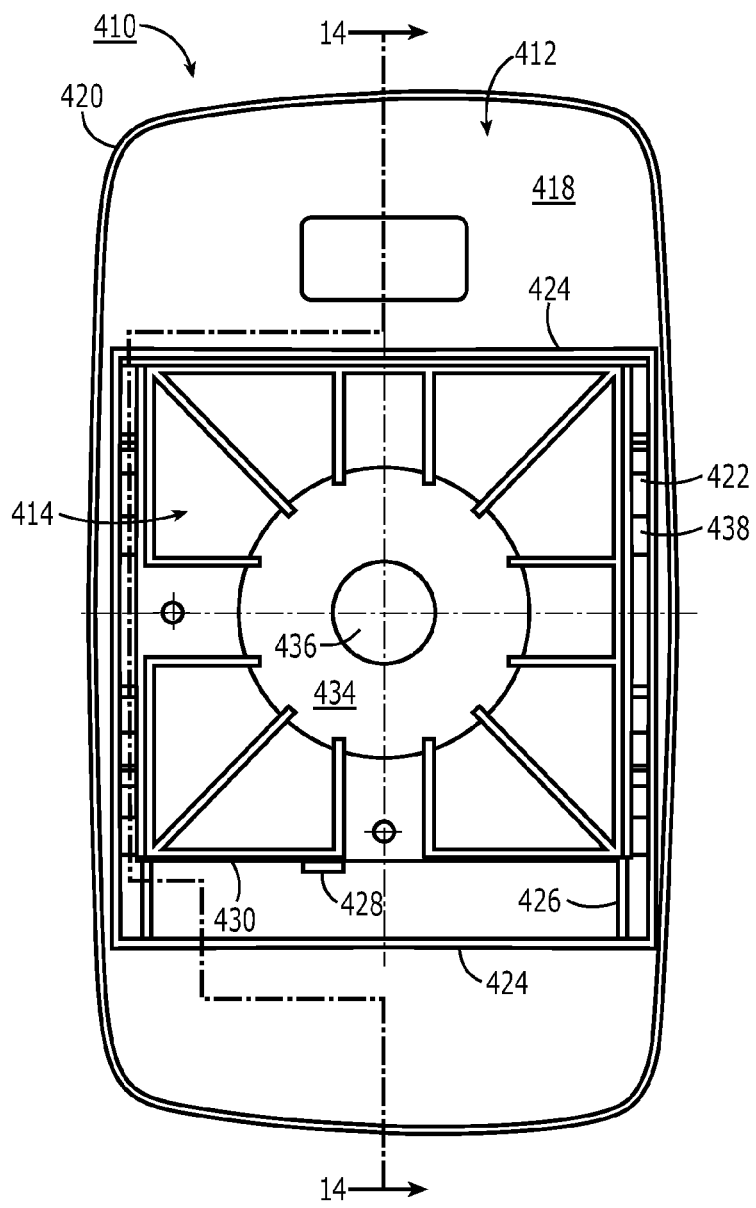
FIG. 13 is a rear elevational view of an external rear-view mirror assembly according to another aspect of the disclosure.
Figure 14:
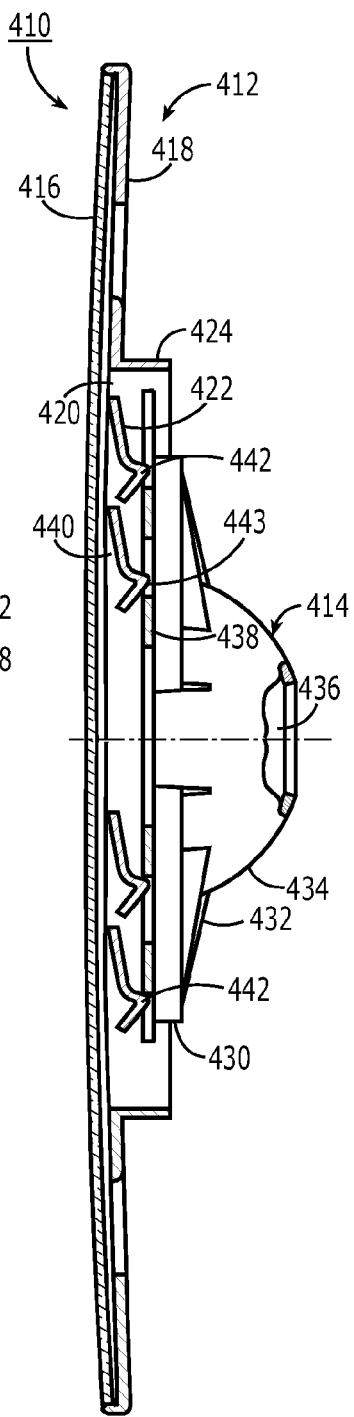
FIG. 14 is a lateral cross-section view through the assembly according to FIG. 13 along section line 14-14.

FIGS. 13 and 14 show a mirror mounting assembly is designated on the whole by the number 410. The assembly 410 generally includes a body, housing, or mirror supporting plate 412, a socket, retaining or connection assembly 414, and a mirror glass or plate 416. As shown in this example, the housing 412 may include a first or back side 418 and a second or front side 420. The connection assembly 414 may be releasably attached or connected to the back side 318, and the convex-shaped mirror glass 416 in this example may be attached to the front side 420 by press-fitting, adhesives, and combinations thereof.

FIG. 13 most clearly shows the connection assembly 414 with an internal or inner perimeter or wall 430 with the holding wall 424 of the housing 412 located around the wall 430. The assembly 414 may incorporate one or more assembly ribs or splines 432 for additional structural integrity and/or for vibration reduction. Also, the assembly 414 may also include a case or secondary housing 434 in which a motor or electronics (not shown) are housed. In this example, the case 434 may be shaped like a ball joint or a partial sphere and may include one or more wire harness apertures 436 for routing cables or wires to control the assembly 410 and to therefore change a reflection in the mirror 416.

FIG. 14 particularly shows a first or assembled state in which the tabs 438 may be inserted past respective snap connectors 342 of receivers 322. As shown, the snaps or fingers 422 may be angled or inclined. In this example, the rounded receivers 422 and their respective snaps 442 are made of polyethylene or other plastic material with an in-built spring constant. Here, the snaps 442 include a knuckle and finger 443 located at the end of the inclined portions for catching and holding at least part of each tab 438. As shown, once the tabs 438 are pressed against the inclined portions, the snaps 442 deflect outward toward the perimeter 420 as the spring constant of the snaps 442 allow them to yield. In this example, the snaps 442 revert to their original positions such that a part of the tabs 438 are retained by the snaps 442 to connect the assembly 414 and the retaining plate 412.

Figure 15:
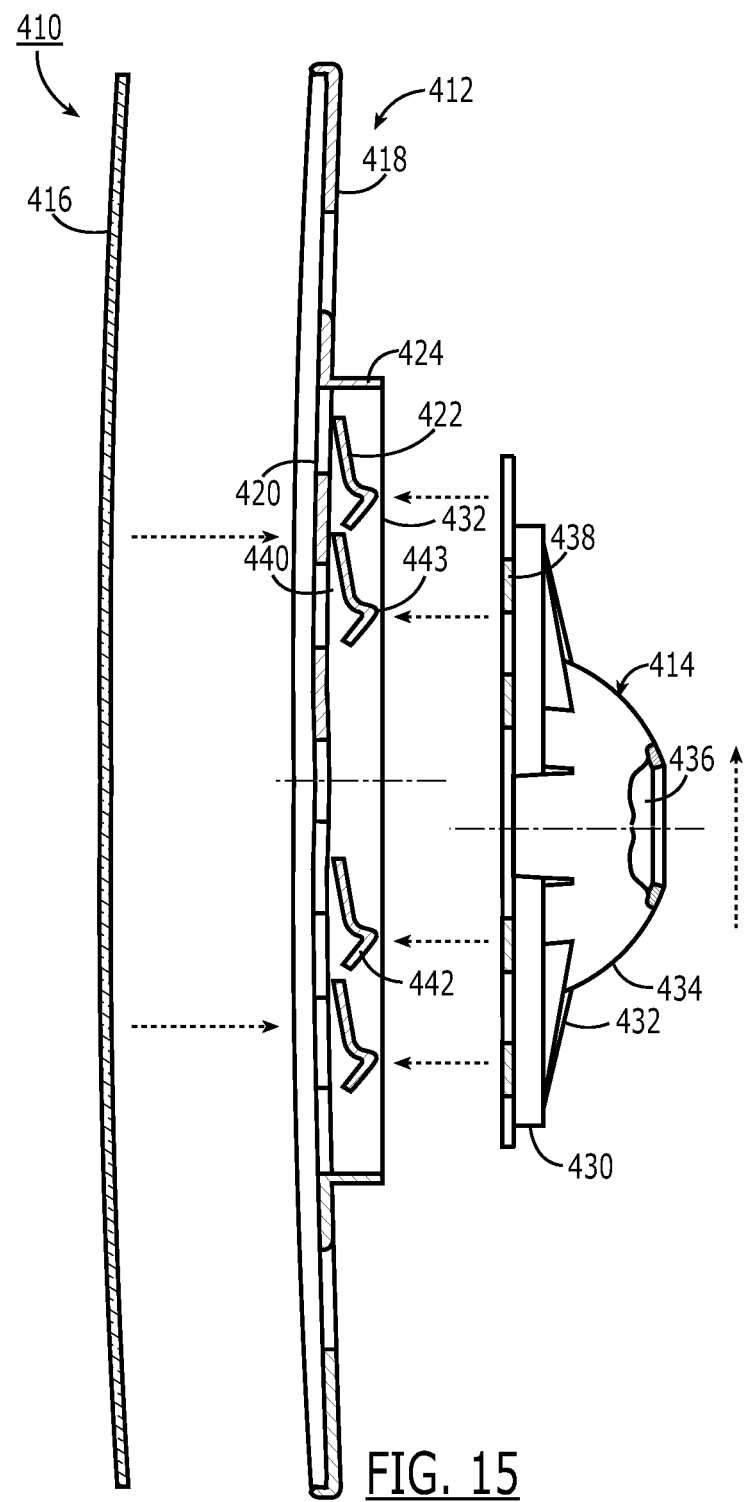
FIG. 15 is lateral exploded and cross-section view through the assembly as in FIG. 13.

FIG. 15 shows the mirror assembly 410 in a pre-assembly or second state in which the retaining plate 412 is located between the connection assembly 414 and the mirror 416. Here, the relationship and possible structure of the tabs 438 and the receivers 422 and their respective snaps 442 with knuckles 443 are shown.

Figure 16:
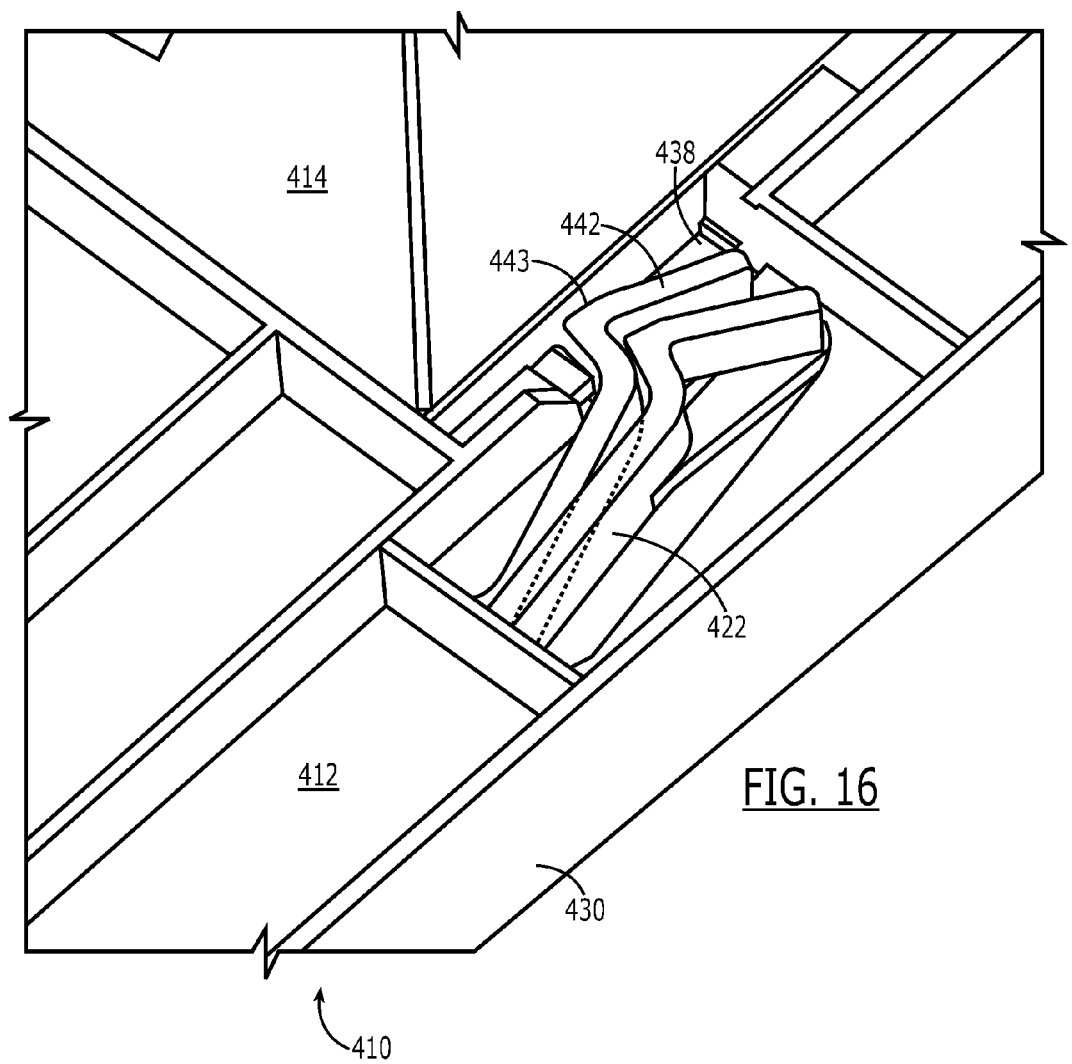
FIG. 16 shows a portion of the assembly as in FIGS. 13-15 in exemplary operation.

FIG. 16 shows the mirror assembly 410 in an interim or third state in which the tabs 438 of the connection assembly 414 have been pushed in a direction of the retaining plate 412 and past the snaps 442 of the receiver or catch 422. More particularly, as shown in duplicate and in phantom to illustrate the action, the catch 442 deflects toward a perimeter 430 as the tab 438 pushes down the sloping or angled catch 442 toward the knuckle 443. The tab 438 therefore causes the catch 442 to move aside and even upward away from plate 412. Once past the catch 443, the receiver 422 springs back over the tab 438 to hold the plate 412 and the assembly 414 together. The receiver 422 may be pulled toward the wall 430 to free the tab 438 and therefore to remove the assembly 414 if desired.

Referring now to FIGS. 17 and 18, a mirror mounting assembly is designated in general by the number 510. The assembly 510 broadly includes a body, housing, or mirror supporting plate 512, a socket, retaining or connection assembly 514, and a mirror glass or plate 516. As shown in this example, the housing 512 may include a first or back side 518 and a second or front side 520. The connection assembly 514 may be releasably attached or connected to the back side 518, and the exemplary convex-shaped mirror glass 516 may be attached to the front side 5420 by press-fitting, adhesives, and combinations thereof.

FIG. 17 most clearly shows the connection assembly 514 with an internal or inner perimeter or wall 530 with the holding wall 524 of the housing 512 located around the wall 530. The assembly 514 may incorporate one or more assembly ribs or splines 532 for additional structural integrity and/or for vibration reduction. Also, the assembly 514 may also include a case or secondary housing 534 in which a motor or electronics (not shown) are housed. In this example, the case 534 may be shaped like a ball joint or a partial sphere and may include one or more wire harness apertures 536 for routing cables or wires to control the assembly 510 and to therefore change a reflection in the mirror 516.

FIG. 18 particularly shows a first or assembled state in which the tabs 538 may be inserted past respective snap connectors 542 of receivers 522. As shown, the receivers 522 may be mirror opposites. In this example, the rounded receivers 522 and their respective snaps 542 are made of polyethylene or other plastic or elastomeric material with an in-built spring constant. Here, the snaps 542 include a knuckle and finger 543 located at the end of inclined portions 543A for catching and holding at least part of each tab 538 with a ledge or detent 543B. As shown, once the tabs 538 are pressed against the inclined portions and slid in a direction toward the mirror 516, the spring constant of the snaps 542 allow them to yield, in this example, away from the mirror 516 and toward the perimeter before springing back such that a part of the tabs 538 are retained by the snaps 542 to connect the assembly 514 and the retaining plate 512.

Figure 19:
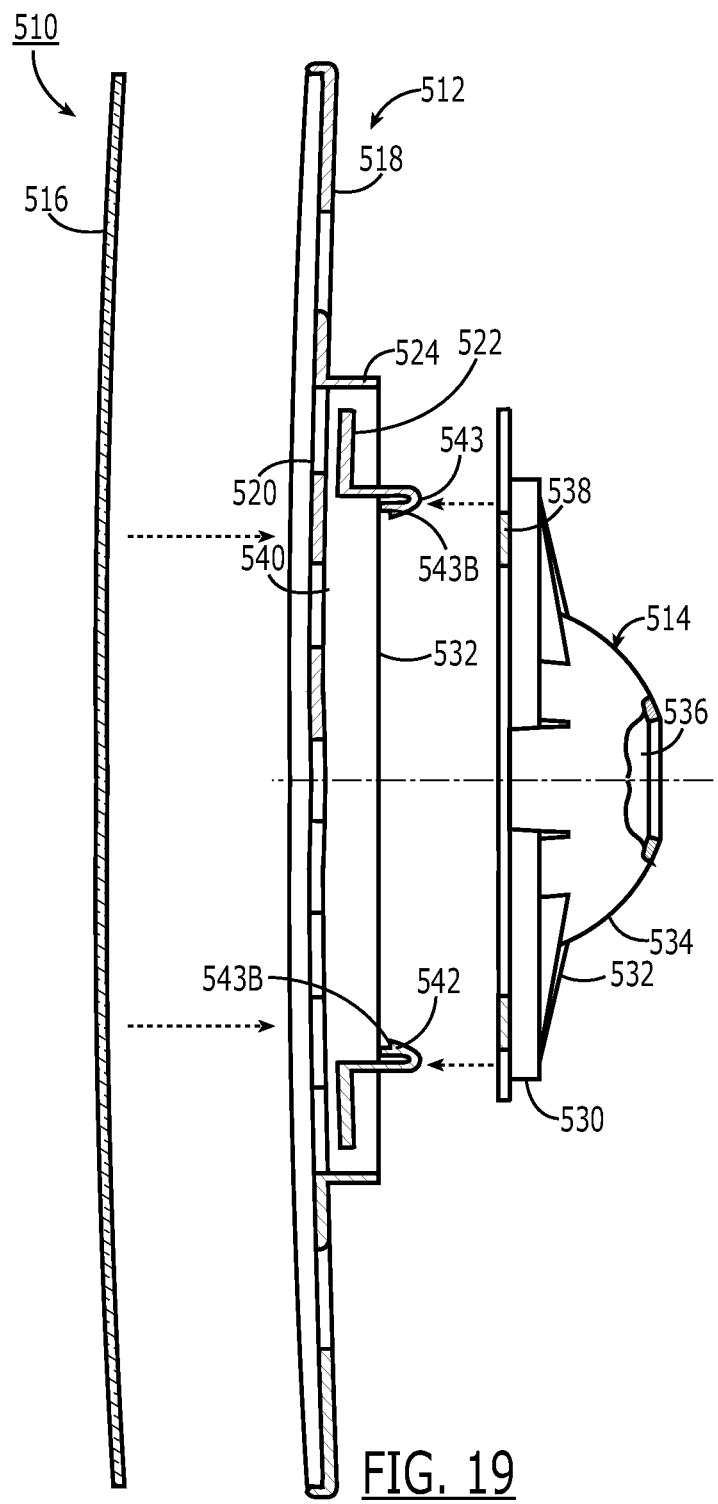
FIG. 19 is lateral exploded and cross-section view of a rear-view mirror assembly according to another aspect of the disclosure.

FIG. 19 shows the mirror assembly 510 in a pre-assembly or second state in which the retaining plate 512 is located between the connection assembly 514 and the mirror 516. Here, the relationship and possible structure of the tabs 538 and the receivers 522 and their respective snaps 542 are shown.

Figure 20A:
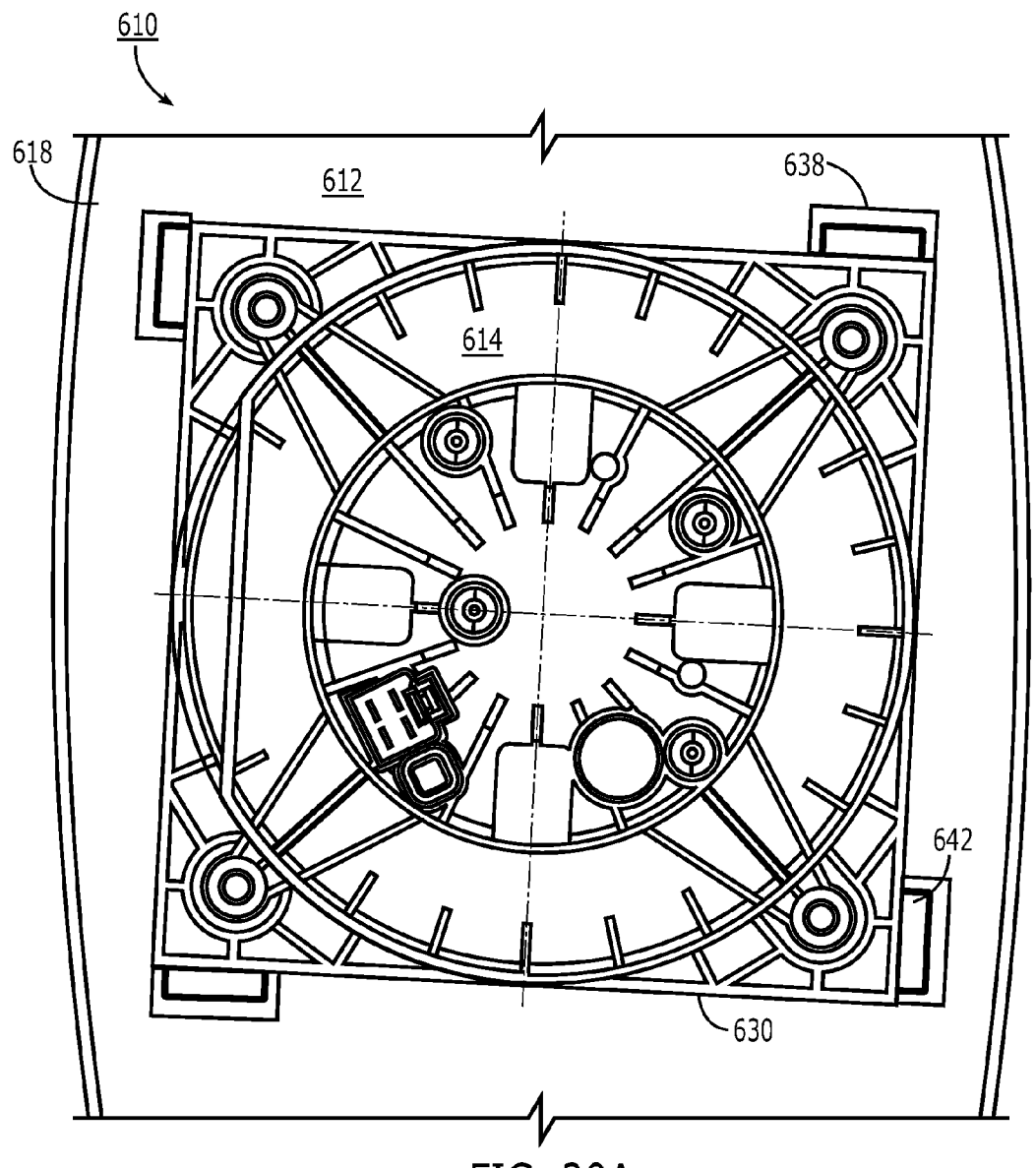
FIG. 20A is a partial rear elevational view of an external rear-view mirror assembly in a first mounting state according to another aspect of the disclosure.
Figure 20B:
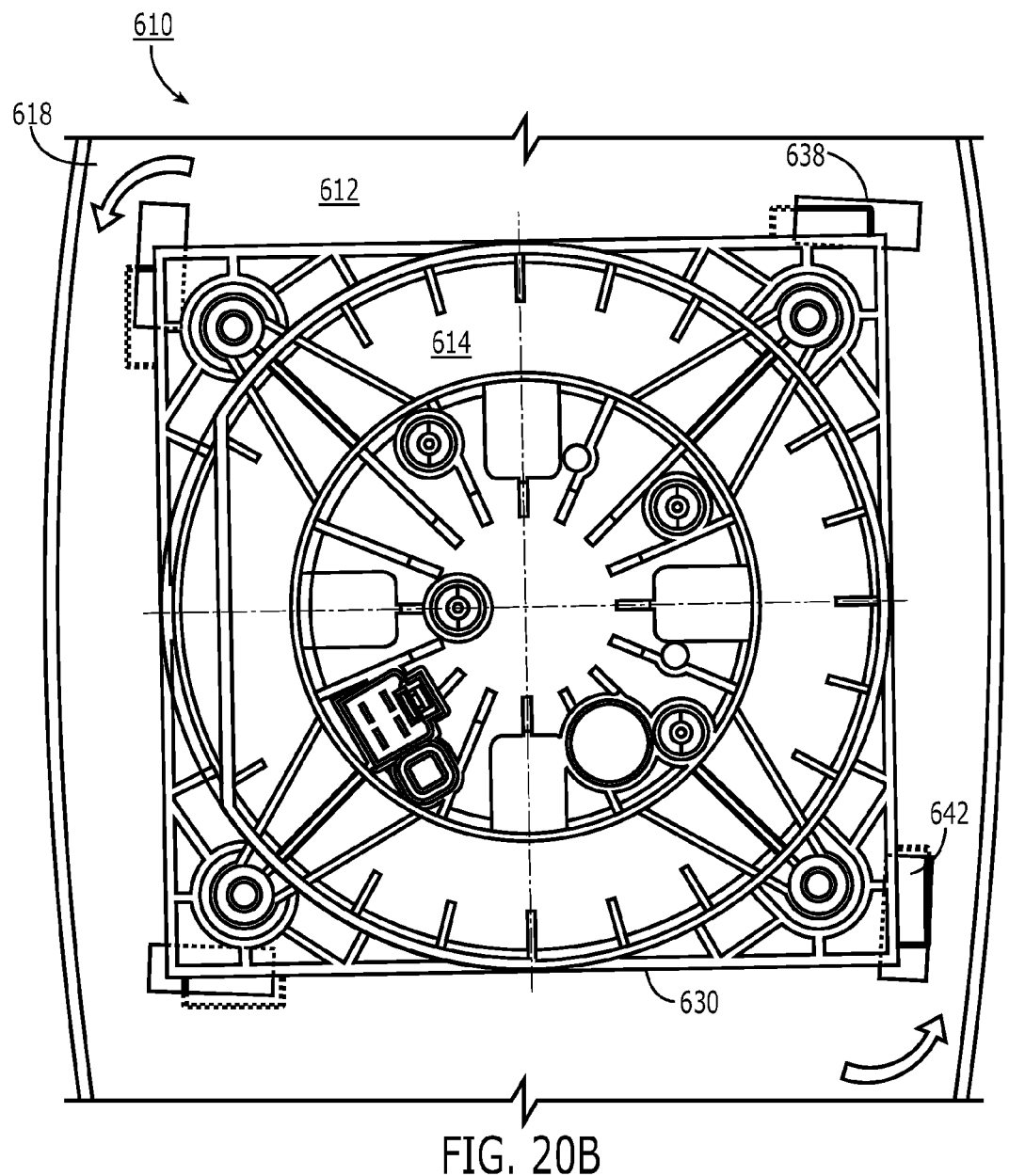
FIG. 20B is a second mounting state of the mirror assembly as in FIG. 20A.

Turning now to FIGS. 20A and 20B, a partially shown mirror mounting assembly is designated in general by the number 610. The assembly 610 broadly includes a body, housing, or mirror supporting plate 612 with one or more apertures or openings 638 formed and oriented at various angles in the rear 618 of the plate 612. As shown, a motor assembly 614 may be releasably attached or connected to the back side 618 by inserting tabs 642 of the motor assembly 614 into the respective openings 638 at complementary angles. The tabs 642 may be numbered and arranged about a perimeter 630 of the assembly 614 as shown, and additional tabs, also of various sizes, may be utilized.

FIG. 20B most clearly shows the motor assembly 614 being rotated counterclockwise in this example relative to the apertures 638. Shown partially in phantom for clarity, the locking relationship of the tabs 642 and the apertures 638 is indicated. More particularly, at least a portion of each of the tabs 642 is pressed into and behind respective portions of the apertures 638 to hold the components together. In this embodiment, one or both of the plate 612 and the motor assembly 614 may be elastically deformed temporarily to press-fit the tabs 642 through and behind the apertures 638. To disassemble, the assembly 614 would be pressed and turned counterclockwise. Of course, the orientation of the apertures 642 and the tabs 638 may be altered to include additional tabs and apertures, for instance, or the counterclockwise and clockwise assembly and disassembly arrangements may be reversed to suit particular requirements.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A vehicle mirror assembly, comprising:
    a mirror retaining plate having a plurality of pockets and a plurality of receivers, the receivers being elastically deformable in at least one plane, and at least one of the receivers being disposed in a first plane and the other receivers being disposed in a second plane elevated from the first plane;
    a connection assembly operatively connected to the mirror retaining plate, the connection assembly having a set of tabs, at least one of the tabs being connectable with a respective receiver in the first plane and the remaining tabs being connectable with respective receivers in the second plane, each of the tabs alternating in size and being configured for insertion into respective pockets by deflecting respective receivers to a second state from a first state, each receiver having a spring constant to cause the receiver to return to the first state to connect the connection assembly with the mirror retaining plate, the connection assembly being movable to change the mirror retaining plate; and
    a mirror glass attachable to the mirror retaining plate.

2. The vehicle mirror assembly as in claim 1, wherein each receiver has a proximal end and a distal end and further comprising a detent disposed at the distal end for connection with at least one of the tabs.

3. A vehicle mirror assembly, comprising:
    a mirror retaining plate having a plurality of pockets alternating in size and a plurality of receivers alternating in size, and at least one of the receivers being disposed in a first plane and the other receivers being disposed in a second plane elevated from the first plane;
    a connection assembly operatively connected to the mirror retaining plate, the connection assembly having a set of tabs, the tabs being configured for insertion into respective pockets and at least one of the tabs being connectable with a respective receiver in the first plane and the remaining tabs being connectable with respective receivers in the second plane, the connection assembly being movable to change the mirror retaining plate and the connection assembly from a first receiving state to a second locking state; and a mirror glass attachable to the mirror retaining plate.

4. A vehicle mirror assembly, comprising:
a mirror retaining plate having a plurality of pockets and a plurality of receivers, at least one of the receivers being different in size, shape, or orientation from the other receivers, and at least one of the receivers being disposed in a first plane and the other receivers being disposed in a second plane elevated from the first plane;
a connection assembly operatively connected to the mirror retaining plate, the connection assembly having a plurality of tabs, at least one of the tabs being different in size, shape, or orientation from the other tabs, the tabs being configured for insertion into the pockets and at least one of the tabs being connectable with a respective receiver in the first plane and the remaining tabs being connectable with respective receivers in the second plane, the connection assembly being adjustable to lock the mirror retaining plate and the connection assembly into a locking state; and
a mirror glass attachable to the mirror retaining plate.

5. A vehicle mirror assembly, comprising:
a mirror retaining plate in a first plane having a plurality of pockets and a plurality of receivers, at least one of the receivers being oriented differently from the other receivers and at least one of the receivers being disposed in the first plane substantially level with the mirror retaining plate and the other receivers being disposed in a second plane elevated from the first plane;
a connection assembly operatively connected to the mirror retaining plate, the connection assembly having a plurality of projections, at least one of the projections being connectable with a respective receiver in the first plane, the remaining projections being insertable into respective pockets and connectable with respective receivers in the second plane, the connection assembly being adjustable to change the mirror retaining plate and the connection assembly from a first receiving state to a second locking state; and
a mirror glass attachable to the mirror retaining plate.

6. A vehicle mirror assembly comprising:
a mirror retaining plate having a plurality of pockets and a plurality of latches, at least one of the latches being oriented differently from the other latches and at least one of the latches being disposed in a first plane and the other latches being disposed in a second plane elevated from the first plane, at least one of the latches having a catch with a spring constant urging that latch into a locking position; and
a connection assembly operatively connected to the mirror retaining plate, the connection assembly having a plurality of projections, at least one of the projections being connectable with a respective receiver in the first plane, the remaining projections being connectable with respective receivers in the second plane, the connection assembly being releasable from a locking state by moving the catch to overcome the spring constant and release the latch from the locking position.

7. The vehicle mirror assembly as in claim 6, further comprising a mirror glass attachable to the mirror retaining plate.

8. A vehicle mirror assembly, comprising:
a mirror retaining plate having a plurality of pockets and a plurality of latches, at least one of the latches being lockable in a first plane substantially level with the mirror retaining plate and the other latches being lockable in a second plane elevated from the first plane, each of the latches having a catch with a spring constant urging the latch into a locking position; and
a connection assembly operatively connected to the mirror retaining plate, the connection assembly having a plurality of projections, at least one of the projections being connectable with a respective receiver in the first plane, the remaining projections being connectable with respective receivers in the second plane, the connection assembly being releasable from a locking state by pressing the catches to overcome the spring constant and release the latch from the locking position.

9. The vehicle mirror assembly as in claim 8, wherein the latches have a spring constant and deflect outward as the projections are pressed against the latches.

10. The vehicle mirror assembly as in claim 8, wherein the latches have a spring constant and deflect in two planes as the projections are pressed against the latches.

11. The vehicle mirror assembly as in claim 8, further comprising a mirror glass attachable to the mirror retaining plate.

12. A method of securing a mirror retaining plate to a vehicle, the method comprising:
providing a mirror housing having a plurality of receivers;
providing a motor assembly having a plurality of tabs depending therefrom;
positioning the mirror housing adjacent the motor assembly;
depressing the tabs of the motor assembly against respective receivers of the mirror housing; and
deflecting the receivers to engage at least a portion of at least one tab;
wherein at least one of the receivers is disposed in a first plane and the other receivers are disposed in a second plane elevated from the first plane, and at least one of the tabs is connectable with a respective receiver in the first plane and the remaining tabs are connectable with respective receivers in the second plane.

13. The method as in claim 12, wherein at least one receiver includes a detent configured to engage at least one tab.

14. The method as in claim 12, wherein at least one receiver includes a knuckle configured to engage at least one tab.

* * * * *